June 12, 1951  D. CAMPBELL  2,556,794
MACHINE FOR SHARPENING SAWS
Filed Aug. 6, 1947  3 Sheets-Sheet 1
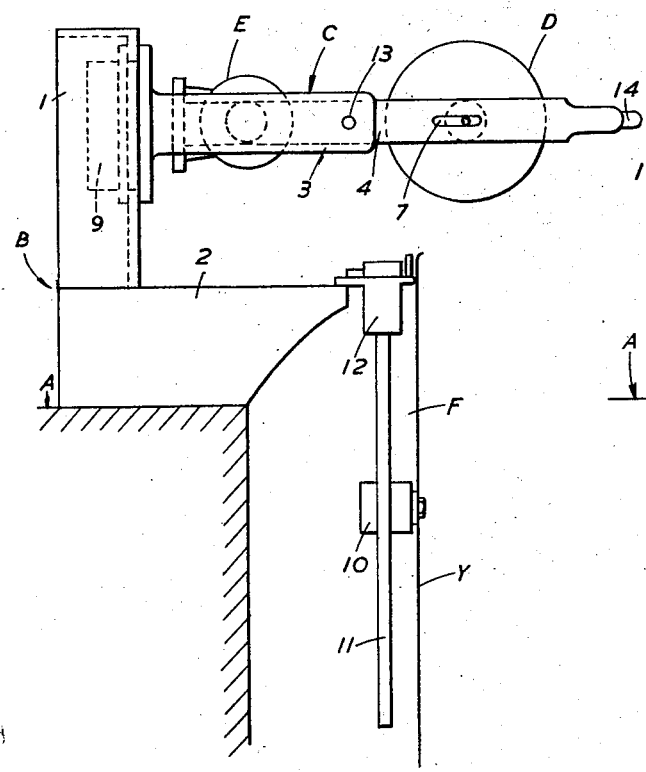
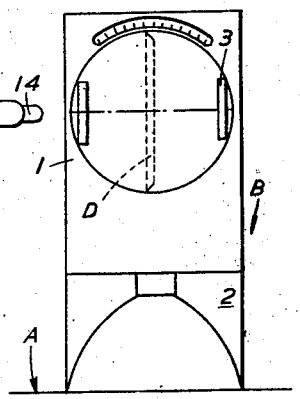
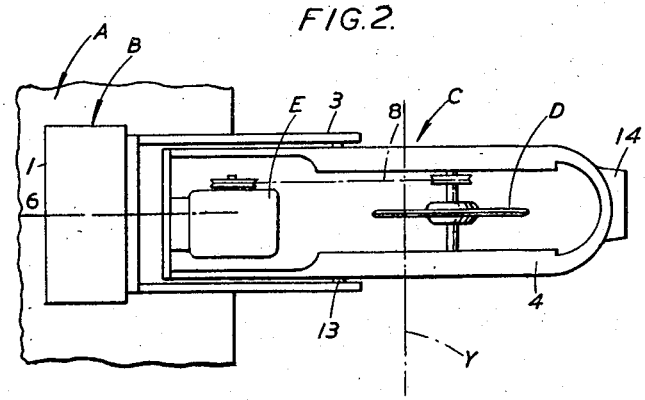
Inventor
Duncan Campbell
By John A. Marzall, atty.

June 12, 1951  D. CAMPBELL  2,556,794
MACHINE FOR SHARPENING SAWS
Filed Aug. 6, 1947  3 Sheets-Sheet 2
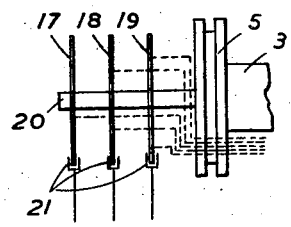
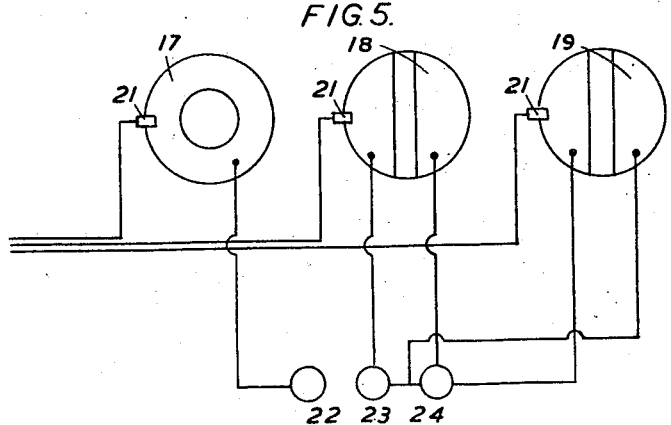
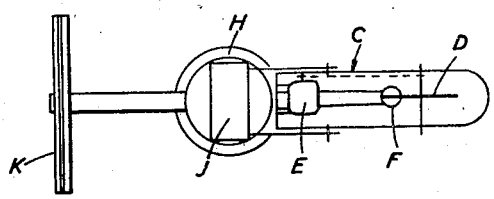
Inventor
Duncan Campbell
By John A. Marzall
Atty.

June 12, 1951 D. CAMPBELL 2,556,794
MACHINE FOR SHARPENING SAWS
Filed Aug. 6, 1947 3 Sheets-Sheet 3
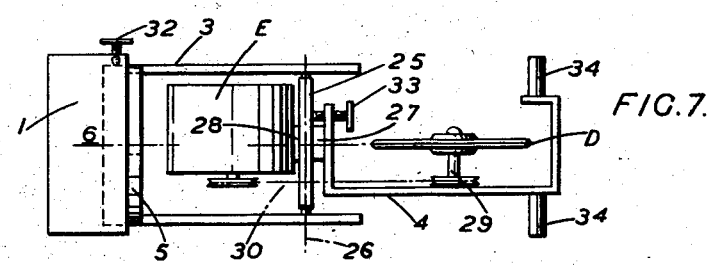
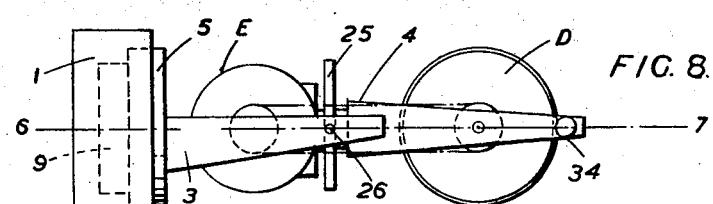
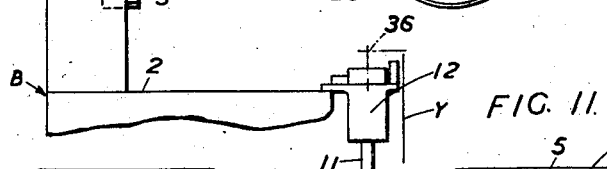
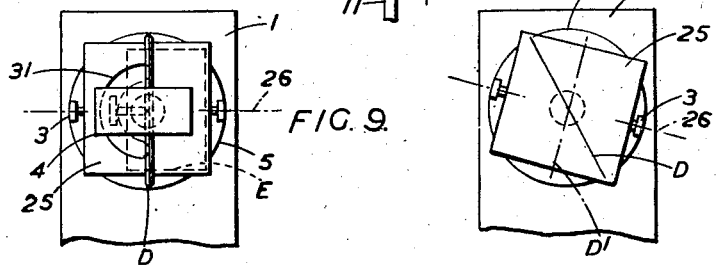
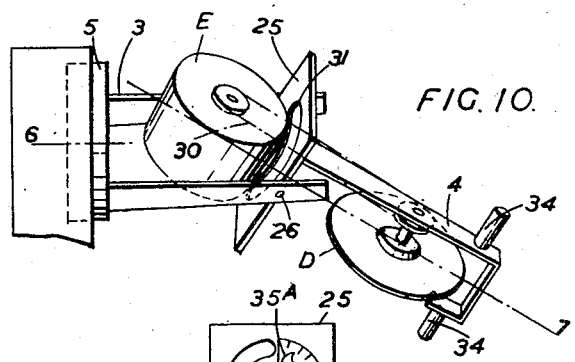
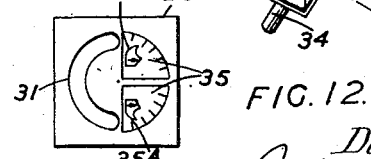

Patented June 12, 1951

2,556,794

UNITED STATES PATENT OFFICE 2,556,794

MACHINE FOR SHARPENING SAWS

Duncan Campbell, Glasgow, Scotland; Elizabeth Campbell and Jessie Louisa Campbell executrices of said Duncan Campbell, deceased Application August 6, 1947, Serial No. 766,597
In Great Britain December 18, 1942

Section 1, Public Law 690, August 8, 1946
Patent expires December 18, 1962

5 Claims. (Cl. 76—40)

This invention refers to saw sharpening machines of the kind comprising a normally stationary support, an arm projecting from the support and pivotally mounted thereon for movement about an axis transverse to the arm, a power-driven grinding disc carried by the arm, a holder by means of which the saw to be sharpened is held while being acted on by the grinding disc, and a counter-weight or equivalent which acts on the arm and tends to move the grinder disc away from the saw, the operator moving the arm by hand against the action of the counter-weight to bring the disc into contact with the saw. For sharpening frame saws the saw holder is of a different construction from the saw holder for circular saws. In machines of the kind above referred to, provision is usually made for enabling a limited tilting movement of the grinding disc to be effected about an approximately horizontal axis in its own plane, so as to facilitate the grinding of the various tooth edges lying at different angles.

The existing practice in saw sharpening machines of the kind in question is to transmit the drive from the stationary support or frame of the machine to the grinding disc, either from a motor on the frame or from a fast and loose pulley arrangement on the frame.

An object of the present invention is to provide a saw sharpening machine of the kind referred to, in which the motor and grinding disc are mounted and arranged as a unit, in which the motor acts as a counter-weight when the disc is moved down on to the saw to be sharpened.

A further object is to provide a saw sharpening machine, in which the disc can be tilted through an angle of substantially 360°, and to provide a reversing arrangement whereby, in the process of inverting the disc by tilting, its drive is reversed.

Thus, assuming that the disc is applied at its lower edge to the saw, the disc can be tilted through angles great enough to bring that edge of the disc which was previously the upper edge into position for application to the saw while, as a result of the reversal, the grinding action takes place in all positions in the same direction relative to the operator, viz. away from the operator. Grinding discs of saw sharpening machines are bevelled at the edge on one face and inversion enables the bevel to be changed from one side to the other.

Preferably the reversing arrangement is adapted to function automatically in the process of inverting the disc.

A still further object is to provide a saw sharpening machine, in which the disc can be moved on to the saw at an angle to the plane of pivotal movement of the disc.

The arm may be made bodily rotatable about a vertical axis relative to the frame of the machine so that the disc can be swung from one side of the frame to another, and a holder for circular saws be provided at the one side of the frame and a holder for frame saws at the other side. Thus, if a circular saw is to be sharpened, the disc is used at the side of the machine where the appropriate holder is situated and if a frame saw is to be sharpened the disc is swung to the other side.

The invention will now be described by way of example with reference to the accompanying drawings, in which—

Figure 1 is a side view of the apparatus,

Figure 2 is a corresponding plan view,

Figure 3 is a corresponding view from the front,

Figures 4 and 5 are electrical diagrams,

Figure 6 shows a modified form of machine,

Figure 7 is a plan view of a further embodiment,

Figure 8 is a corresponding side view.

Figure 9 is a front view,

Figure 10 is a side elevation, showing the arm and disc at different angles,

Figure 11 is a part-diagrammatic front view showing the arm and disc at different angles, and Figure 12 is a front view showing part of the machine in detail.

The saw sharpening machine is shown as being mounted on a bench A. The machine comprises a support B which is secured to the bench A, the support having two parts, an upright box-shaped part 1, and a horizontally extending part 2.

An arm is denoted as a whole by C, a grinding disc by D, a motor by E, and a holder for circular saws by F, the last being carried by the horizontal part 2 of the support B.

The arm C comprises two parts 3 and 4. The part 3 is of approximately U-shape, see Figure 2, and has a circular part 5 at its rear by which it is pivotally mounted in a circular opening in the face of the vertical part 1 of the support B. In this way, the part 3 can turn about an axis 6, see Figure 2, at right angles to the face of the vertical part 1 of the support. The part 4 of the arm, which is in the form of a substantially rectangular frame, see Figure 2, is carried by the part 3, being pivoted thereto about an axis 13. At its rear this part 4 carries the motor E and on the front side of the axis 13 it carries the disc D the spindle of which is held in slots 7 to provide for its longitudinal adjustment. The disc is driven from the motor by a belt drive 8. The outer part 4 of the arm can thus be rocked about the axis 13 to a limited extent, the motor acting as a counter-weight tending to cause the part 4 to lie in the position with the grinding disc raised.

Within the vertical part 1 of the support B there is an electric reversing switch 9, details of which are shown in Figures 4 and 5.

In operation, a circular saw as indicated at Y is clamped to a block 10 which is adjustable up and down a vertical slotted bar 11. The bar 11 can be turned about its vertical axis relative to a sleeve 12 by means of which it is fixed to the part 2 of the support B. This holder for the saw is of substantially usual type. The operator, standing in front of the machine and gripping the handle 14 at the outer end of the arm C, brings the grinding disc D down into contact with the teeth of the saw. He can tilt the grinding disc about the axis 6 throughout 360°. The direction of rotation of the grinding disc is such that the lower operative edge of the disc rotates away from the operator, and it is desirable that this condition should be maintained regardless of the tilt of the disc. Thus, when the operator tilts the disc through an angle of something over 90° from the normal vertical position, the switch 9 operates and reverses the motor. The motor runs thus until the angle of tilt approaches 270° from the normal, when the switch again reverses the motor. Similar reversal is obtained if the disc is tilted back towards normal.

Referring to Figures 4 and 5, and assuming that the motor is of the three-phase type, the reversing switch 9 comprises three discs 17, 18 and 19, carried on a shaft 20 extending rearwardly from the bearing part 5 of the arm C. The disc 17 has its entire peripheral portion made of conducting material while the discs 18 and 19 have each two approximately semi-circular conducting segments insulated from one another. A brush 21 connected to the electric supply mains contacts with each of the discs 17, 18 and 19. The three terminals 22, 23 and 24 represent the motor terminals. From the periphery of the disc 17 a connection is led to the terminal 22 and from each segment of the discs 18 and 19 connections are led to the terminals 23 and 24. In practice, as shown in Figure 4, these leads are carried axially through the successive discs and through the bearing part 5 to the motor so that all these parts turn with the tilting of the motor and twisting of the leads is avoided. In the condition shown in Figure 5, the terminal 23 is served from the disc 18 and the terminal 24 from the disc 19. If the discs are turned by the tilting of the motor at a certain position a change-over takes place with the result that the disc 18 serves the terminal 24 and the disc 19 serves the terminal 23, the connection to the terminal 22 remaining the same. In this way reversal is effected.

Figure 6 shows diagrammatically in plan an arrangement in which the machine provides for sharpening circular saws or frame saws. It comprises a stand H carrying a support J corresponding with the vertical part 1 of the support B, Figures 1, 2 and 3. The support J carries an arm, motor and grinding disc as in Figures 1, 2 and 3, the support being capable of turning about a vertical axis. The stand carries a circular saw holder F and a frame saw holder K, and the grinding disc D can be swung to a position above either holder.

In the embodiment shown in Figures 7 and 8 of the drawing, the support B, its parts 1 and 2, the part 3 and the bearing part 5 of the arm C, the reversing switch 9, and the bar 11 and sleeve 12, are all as above described with reference to Figures 1 to 6. The grinding disc D, the electric motor E and the part 4 of the arm C are substantially as above described and illustrated, but certain modifications have been made in mounting said parts on the part 3, and these will now be described in detail.

A rectangular plate 25 is mounted on the part 3 and is pivotal thereto about an axis 26. The motor E is mounted centrally on the rear of the plate 25 and the part 4 on the front. Both are rigidly interconnected by a short shaft, not shown, which passes through the plate 25 and collars 27 and 28. The disc D is mounted on an axle 29 which is rotatably mounted in the part 4, and the disc is driven from the motor by a belt drive 30. An arcuate aperture 31 is provided in the plate 25 to allow the bolt 30 to pass through the plate, and the arc of said aperture subtends an angle of 180° at the centre of the plate 25, Figures 9 and 10. It will be clear from the above description, that the part 3 can rotate through 360° about the axis 6 and that the motor and disc can rock as a unit about the transverse axis 26, as previously described, and that the motor E and disc D can rotate as a unit through 180° about the longitudinal axis 7 relative to the part 3 of the arm C. A locking screw 32 is provided for locking the part 3, when set to the required angle relative to the part 1 of the support B, and a locking screw 33 is provided for locking the part 4 relative to the plate 25.

Referring to Figure 11, in which various parts are shown diagrammatically, the part 3 is shown set at an angle to the horizontal. The chain-dotted line D¹ shows the position the disc would adopt in accordance with the first above described embodiment. It will be clear that, from this setting, the movement of the disc D¹ is limited to a rocking movement in its own plane about the axis 26. The line D shows, by way of example, a position to which the disc can be rotated about the axis relative to the part 3, in accordance with the present invention, and it will be clear that the disc can be rocked about the axis 26 and applied to the saw, at such an angle.

Figure 10 shows by way of further example an alternative setting of the machine.

Hand-grips 34 are provided on the part 4, and can be used to rotate both parts 3 and 4 about the axis 6 when the locking screw 32 is loosened and the screw 33 tightened, and alternatively to rotate the part 4, with the disc motor, about the axis 7 relatively to the part 3 when the screw 32 is tightened and the screw 33 loosened. The hand-grips 34 are of course also used for rocking the motor and disc about the axis 26.

In the first above described embodiment of the machine, it is possible to sharpen only the leading cutting edge as distinct from the top edge of each tooth of the saw, but with the present embodiment it is possible to sharpen both the leading and top edges of each tooth, due to the fact that the disc D and motor E are rotatable about the axis 7 relatively to the part 3, so that the disc D can be moved downwards on to the tooth at an angle to the plane of downward movement about the axis 26.

As shown in Figure 12, indicator plates 35 are provided on the front of the plate 5, so that the angle of rotation to which the disc is set may be checked. The plates 35 also indicate at 35^A the diretcion in which the teeth of the saw should face, when the machine is to be operated.

It is to be understood that the reversing switch 9 is operated by rotation of the part 3, and that rotation of the disc and motor relative to the part 3 does not operate the switch.

An adjustable stop indicated diagrammatically by the chain dotted lines 36, Figure 8, is provided at the top of the bar 11 for successively locating the teeth of the saw, and screw-adjustable stops, not shown, are provided on the part three for limiting the amount of rocking movement of the disc and motor about the axis 26.

This embodiment of the machine also may be adapted for sharpening circular saws or frame saws, as above described with reference to Figure 6.

I claim:

1. A saw sharpening machine of the kind referred to, comprising a fixed support, an arm which consists of a first part projecting from the support and a second part pivotally mounted relative to the first part about an axis transverse thereto, a grinding disc and an electric motor for driving said disc mounted on said second part, the disc, the motor and the second part of the arm being mounted as a unit which is pivotal as a whole about said transverse axis, the motor acting as a counter-weight, a pivotal mounting in said support for the first part of the arm so that said part can pivot through substantially 360° about an axis extending longitudinally thereof, and a reversing switch for the electric motor incorporated in said support and actuated by rotation of the first part of the arm, so that when the disc is tilted through an angle of substantially 90°, the direction of rotation of the disc is reversed, and similarly on tilting through substantially a further 180°, the direction of rotation of the disc is again reversed.

2. A saw sharpening machine as claimed in claim 1, in which said unit is rotatable also about its longitudinal axis relative to the first part of the arm, so that, in any position to which the first part of the arm is rotated the unit may be rotated about its longitudinal axis with the disc at angle to the plane of pivotal movement of the unit about said transverse axis.

3. A saw sharpening machine as claimed in claim 1, in which said unit is carried by a supporting plate mounted on the first part of the arm and pivotal about said transverse axis, and said plate includes a pivotal mounting for the unit about which the latter is rotatable about its longitudinal axis, the motor and disc being located on opposite sides of the plate.

4. A saw sharpening machine as claimed in claim 3, including a belt drive from the motor to the grinding disc, and an arc-shaped aperture in said plate through which the belt passes.

5. A saw sharpening machine as claimed in claim 4, in which said arc-shaped aperture extends through substantially 180° so that the disc and motor are rotatable about said longitudinal axis through substantially 90° on each side of said transverse pivotal axis.

DUNCAN CAMPBELL.

REFERENCES CITED

The following references are of record in the file of this patent:

UNITED STATES PATENTS

| Number | Name | Date |
| --- | --- | --- |
| 105,543 | Borthwick | July 19, 1870 |
| 139,139 | Frey | May 20, 1873 |
| 142,173 | Olney | Aug. 26, 1873 |
| 261,646 | Olney | July 25, 1882 |
| 545,064 | Fleck | Aug. 27, 1895 |
| 1,345,919 | Gabelman | July 6, 1920 |
| 1,413,928 | Mummert et al. | Apr. 25, 1922 |
| 1,462,420 | Mikaelson et al. | July 17, 1923 |

FOREIGN PATENTS

| Number | Country | Date |
| --- | --- | --- |
| 73,258 | Sweden | Dec. 8, 1931 |